US006628715B1

United States Patent
Iu et al.

(10) Patent No.: US 6,628,715 B1
(45) Date of Patent: Sep. 30, 2003

(54) METHOD AND APPARATUS FOR ESTIMATING OPTICAL FLOW

(75) Inventors: Siu-Leong Iu, San Jose, CA (US); Yun-Ting Lin, Ossining, NY (US)

(73) Assignee: Digital Video Express, L.P., Herndon, VA (US)

( * ) Notice: Subject to any disclaimer, the term of this patent is extended or adjusted under 35 U.S.C. 154(b) by 0 days.

(21) Appl. No.: 09/484,039

(22) Filed: Jan. 18, 2000

Related U.S. Application Data (60) Provisional application No. 60/116,001, filed on Jan. 15, 1999.

(51) Int. Cl.[7] ................................................ H04N 7/12
(52) U.S. Cl. ................................................ 375/240.16
(58) Field of Search ....................... 375/240.01, 240.12, 375/240.16, 240.26; 382/232, 235, 238; H04N 7/12

(56) References Cited

U.S. PATENT DOCUMENTS 5,471,252 A   11/1995   Iu

OTHER PUBLICATIONS

J.L. Barron, D.J. Fleet, and S.S. Beauchemin. Systems and experiment: Performance of optical flow techniques. Int'l Journal of Computer Vision, 12(1):43–77, 1994.
B.K.P Horn and B.G. Schunck. "Determining Optical Flow" Artificial Intelligence, vol. 17, pp 185–203, 1981.
M.R. Luettgen, W.C. Karl, and A.S. Willsky. Efficient multiscale regularization with applications to the computation of optical flow. IEEE Trans. On Image Processing, 3(1):41–63, 1994.
J. Konrad et al. Bayesian Estimation of Motion Vector Fields. IEEE Transactions on Pattern Analysis and Machine Intelligence, vol. 14, pp 910–927 Sep. 1992.
S.–L. Iu. Robust estimation of motion vector fields with discontinuity and occlusion using local outliers rejection, J. of Visual Communication and Image Representation, 6(2):132–141, Jun. 1995.
L. Ng and V. Solo. Choosing the optimal neighborhood size in optical flow problems with errors–in–variables modeling. In Proc. ICIP, 1998.
R. Depommier et al. Motion Estimation with Detection of Occlusion Areas. IEEE International Conference on Acoustics and Speech Signal Processing, pp. III 269–272, 1992.
E. Hilderith. Computations Underlying the Measurement of Visual Motion. Artificial Intelligence, vol. 23 pp 309–354, 1984,
S. Genman et al. Stochastic Relaxation, Gibbs Distributions, and the Bayesian Restoration of Images. IEEE Transactions on Pattern Analysis and Machine Intelligence, vol 6, pp 721–741, Nov. 1984.

*Primary Examiner*—Young Lee
(74) *Attorney, Agent, or Firm*—David G. Grossman (57) ABSTRACT

An apparatus for generating an image motion vector field which describes a motion of individual image components of a first image frame and corresponding image components of a second image frame in a sequence of image frames. The apparatus comprises a first frame memory for receiving said first image frame, a second frame memory for receiving a second image frame, and an optical flow calculator. The optical flow calculator is configured for generating an image motion vector field by iteratively comparing a predicted image with the second image frame. The predicted image is generated according to a current motion estimate in proximity to an observation point, wherein the observation point migrates according to a previous motion estimate and is implemented by the calculator to generate a current motion estimate.

21 Claims, 9 Drawing Sheets

Prior Art

FIG. 1

Prior Art

FIG. 2

Prior Art

FIG. 3

Prior Art

FIG. 4A

Prior Art

METHOD AND APPARATUS FOR ESTIMATING OPTICAL FLOW

This application claims priority to co-pending provisional application Ser. No. 60/116,001, to Iu, filed on Jan. 15, 1999, entitled "Optical Flow Algorithm with Outlier Rejection For Motion Estimation", the contents of which are incorporated by reference herein.

FIELD OF THE INVENTION

The invention relates generally to the field of video processing, and more particularly to an apparatus and method of estimating optical flow, including motion estimation and analysis of video and multimedia content.

BACKGROUND OF THE INVENTION

Determining optical flow or image motion is important to computer vision and image processing. Accurate and efficient motion field estimation is meaningful for general video processing and applications, such as motion compensation coding of digital TV, noise reduction for video sequences, frame rate conversion and target tracking. Motion field estimation is also important for computer vision and human vision, such as for the recovery of 3-D motion and the structure of moving objects, and image registration.

An example of where motion field estimation is particularly useful is in MPEG video data compression. One of the main techniques to achieve high compression relies on accurately determining blocks of each frame that are in motion. Data describing the motion for only those blocks in the video determined to be in motion are encoded in the video stream between frames. This results in memory and bandwidth savings.

Optical flow is typically represented as a motion vector field that is a pixel-by-pixel map of image motion from one image frame to the next image frame. Each pixel in the frame has a motion vector that defines a matching pixel in the next or previous frame. The combination of these motion vectors is the motion vector field.

Although the techniques described herein could easily be applied to image components other than frames, such as image fields or portions of image frames, the description below refers only to image frames so as to avoid confusion in terminology with the fields of motion vectors.

The problem of estimating motion vector fields is inherently difficult to achieve. This is because many different sets of motion vector fields may be used to describe a single image sequence.

One simple approach is to assume that a block of pixels moves with the same kind of motion such as constant translation or an affine (planar) motion. This kind of block matching approach frequently fails to produce a good estimation of motion because the motions of pixels outside of the block are disregarded. Thus, such a motion model may be incorrect for describing the true motion of pixels within a block when the block size is large and may be significantly affected by noise when the block size is small.

Conventional approaches to the problem of estimating motion vector fields typically require simultaneously solving equations having several thousand unknown quantities. Numerous techniques, based on gradients, correlation, spatiotemporal energy functions, and feature matching functions have been proposed. These techniques have relied upon local image features such as the intensity of individual pixels and on more global features such as edges and object boundaries.

Two processes have been proposed which have successfully solved two problems in motion vector estimation: motion vector discontinuity and occlusion. The first of these processes is the "line process" described in a paper by J. Konrad et al entitled "Bayesian Estimation of Motion Vector Fields" IEEE Transactions on Pattern Analysis and Machine Intelligence, vol. 14, pp 910–927 September 1992. The second process is the "occlusion process" described in a paper by R. Depommier et al entitled "Motion Estimation with Detection of Occlusion Areas" IEEE International Conference on Acoustics and Speech Signal Processing, pp. III 269–272, 1992. Although successful, these processes increase substantially the number of unknowns that need to be estimated and also introduce other parameters particular to the line and/or occlusion processes.

Global formulations over the complete motion field have been proposed to deal with deficiencies of the block matching techniques. One such formulation is proposed by B. Horn and B. Schunck in a paper entitled "Determining Optical Flow" Artificial Intelligence, vol. 17, pp 185–203, 1981. According to this proposal, motion vectors are estimated by minimizing the error of a motion constraint equation and the error of motion smoothness over the entire image. In this formulation, the motion constraint equation is derived from the assumption that the image intensity is constant along the motion trajectory. In other words, the first derivative of the 3D intensity function with respect to time is zero (e.g. $dE/dt=0$), where $E(x,y,t)$ is the image intensity over space and time. Any departure from this assumed smooth motion is measured as the square of the magnitude of the gradient of motion vectors. While this approach improves the handling of general types of motion, such as elastic motion, the motion vector fields tend to blur at places where the motion is not continuous (i.e. at motion boundaries). This example is probably the most popular method due to its simplicity and reasonable performance. In practice however, it has long been neglected that this constraint is correct only in an infinitesimal neighborhood around the observation point.

In a paper by E. Hilderith, entitled "Computations Underlying the Measurement of Visual Motion," Artificial Intelligence, vol. 23 pp 309–354, 1984, a partial solution to the problem of handling motion boundaries is proposed. According to this proposal, the motion vector field is assumed to be smooth only along a contour but not across it. This proposal overcomes the blurring problem. Because, however, motion vectors at points not lying along contours cannot be obtained, this technique cannot propagate motion information across contours, such as those due to textures, which do not correspond to motion boundaries. These types of contours are common in real-world images.

A technique which combines the line process along with Markov random field modeling and stochastic relaxation has been proposed by S. Genman et al. in a paper entitled "Stochastic Relaxation, Gibbs Distributions, and the Bayesian Restoration of Images," IEEE Transactions on Pattern Analysis and Machine Intelligence, vol 6, pp 721–741, November 1984. The described technique was used for restoring degraded images. In this context, a line process is a boolean field to mark the image intensity boundaries. Other researchers have adapted this idea to overcome the blurring problem of an estimated motion vector field by modifying the line process to indicate motion boundaries. An example of this technique is contained in the above referenced paper by J. Konrad et al. One drawback of this method is that one additional unknown must be introduced for every two adjoining pixels in order to implement the line process. These additional unknowns greatly increase the computational overhead of any algorithm which employs this method.

Occlusion, by definition, means that part of the image cannot find a matching part in another image which corresponds to the same part of the scene. That part of the image was occluded from one image frame to the next. Occlusion appears quite often in real-world images when, for example, one object moves in front of another object, an object moves toward the camera, or an object rotates. If only two frames are used, there may be difficulty in obtaining a good estimate of motions with occlusion because, for at least some parts of one image, there is no corresponding image part in the other image.

One simple solution to this problem is to use three image frames, a target frame, and the frames occurring immediately before and immediately after the target frame. In most cases of real-world images, a matching portion for image parts in the middle frame can be found in either the preceding or succeeding frame. The above referenced paper by Depommier et al. proposes a combination of the line process, as set forth in the Konrad et al. paper, with an occlusion process to detect occlusion areas using three frames. One drawback of this combination, however, is that this combination requires even more unknowns and parameters to produce the model than the line process alone.

U.S. Pat. No. 5,471,252 to Iu, dated Nov. 28, 1999, describes a method and apparatus for estimating motion vector fields, the contents of which are incorporated by reference herein. However, the present invention efficiently generates a more accurate resultant vector motion field and is better at handling large motions and discontinuities. Improvement in the estimates and improved ability to cope with larger motion is desirable. Such an improvement to estimations would preferably migrate the observation point gradually according to new motion estimates, execute faster, have better convergence, and be capable of handling a larger degree of frame to frame motion than in the current art. There is also a need to more efficiently handle motion discontinuities in the flow field during iteration processing to more effectively reduce motion compensated intensity differences and motion estimation errors.

A review of vector fields techniques is presented followed by a formulation to the problem of determining optical flow. Then a prior art optical flow algorithm by Horn and Schunck is examined.

Vector Field Techniques

To understand the operation of the proposed invention, it is helpful to review the conventional technique for defining motion vector fields using smoothness assumptions in order to understand the nature of the problem.

When a camera moves relative to objects being imaged, there are corresponding changes in the image. Disregarding, for the moment, the occlusion of areas and newly exposed areas, for every point of an image at time t, there exists a corresponding point in another image captured at a different time t'. Every such pair of points may be connected by a respective straight line to yield a set of motion vectors and to define a displacement field (motion vector field) as the set of these vectors are projected on the image plane. The purpose of motion vector field estimation is to estimate such a motion vector field from an observed image sequence. This motion vector field may then be used for various types of image processing, for example, computer vision, the motion compensated coding of moving images, noise reduction of moving images and frame-rate conversion.

Figure 1:
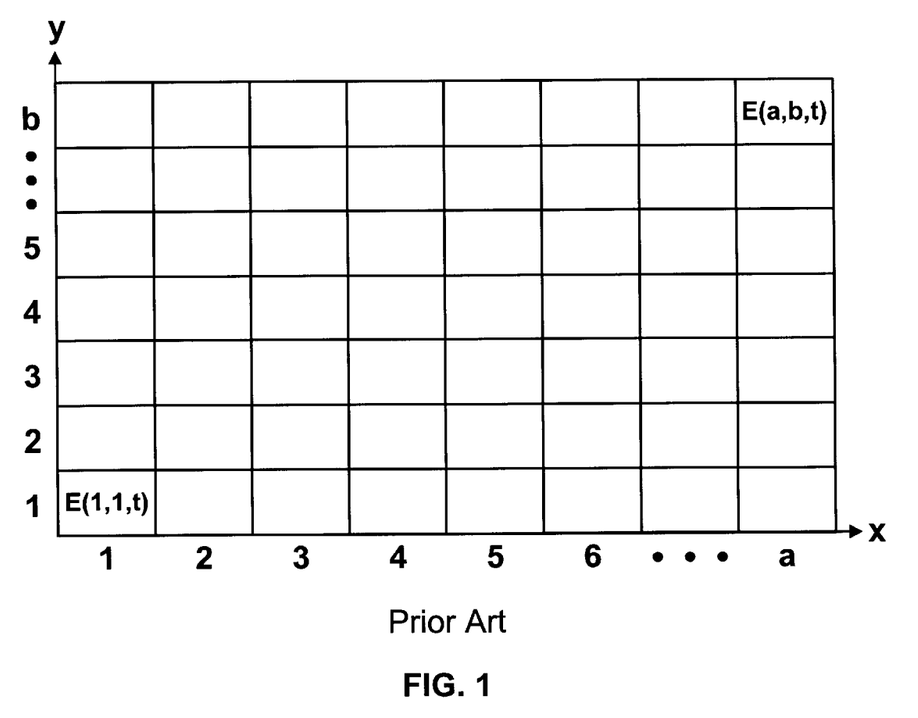
FIG. 1 is a drawing of an input video frame.

Reference is now made to FIGS. 1 through 5 to describe the operation of the process. In FIG. 1 a video frame is depicted. Each rectangle portion corresponds to a respectively different image component which is preferably a pixel or group of pixels. The pixels may be referenced by x and y values respectively. Each pixel may have a value that is preferably represented by an intensity value E(x,y,t) in the image plane at time t. The horizontal location of the pixel is represented by 'x' and is preferably numbered between 1 and a maximum value illustrated in this example as 'a'. The vertical location of the pixel is represented by 'y' and is preferably numbered between 1 and a maximum value as illustrated here as 'b'. Time is represented as 't'. The image in FIG. 1 is shown having contrasting central and surrounding parts for clarity in the description.

Figure 2:
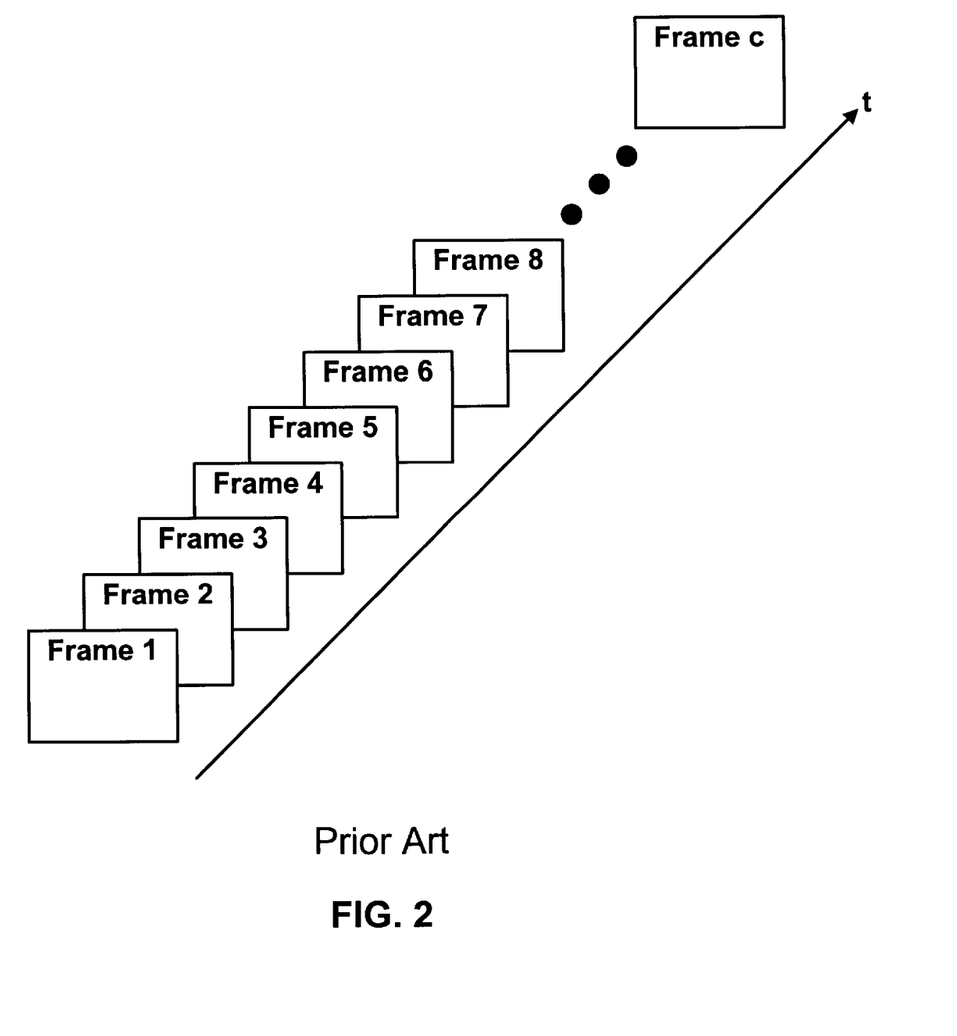
FIG. 2 is a drawing of a video sequence.

FIG. 2 illustrates how a video sequence may be made from a series of successive video frames. Each frame is shown sequentially as time 't' increases. In the present invention, motion is preferably analyzed between a series of adjacent frames.

Figure 3:
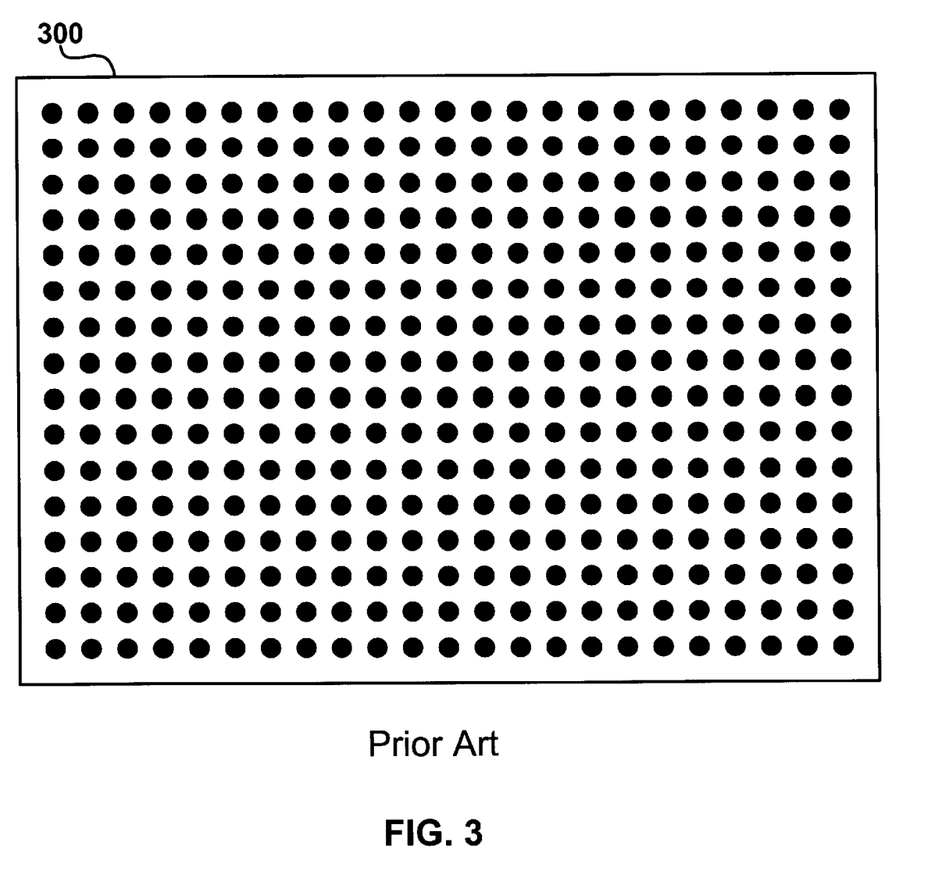
FIG. 3 is a drawing of a motion vector field.

If there is no motion between two successive frames, a motion vector field 300 such as that shown in FIG. 3 is generated. In this motion vector field, all vector elements are zero, indicating no motion in the image.

Figure 4A:
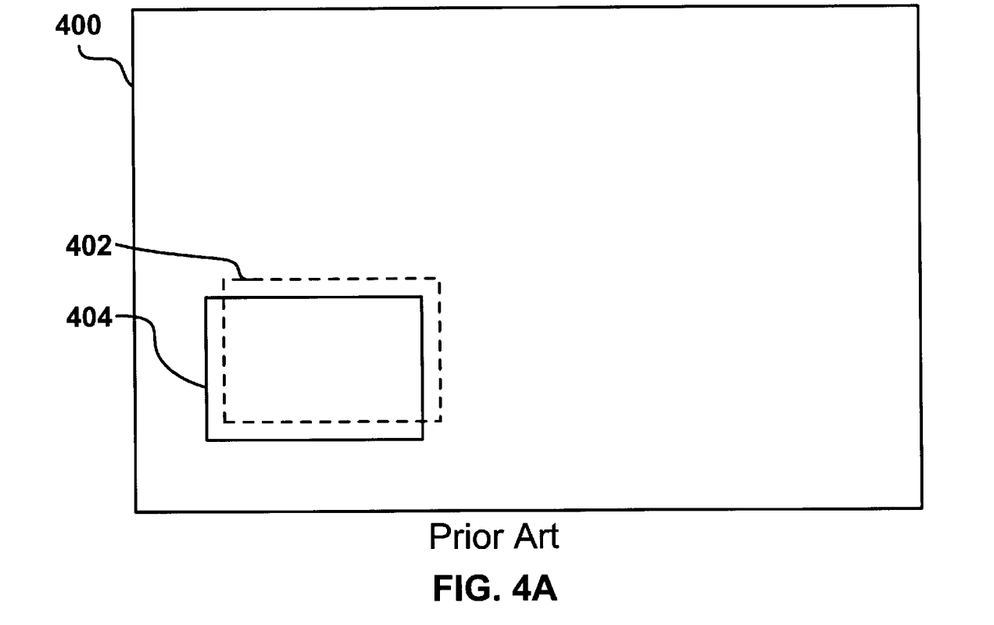
FIG. 4A is a drawing of a moving component in two consecutive input video frames.
Figure 4B:
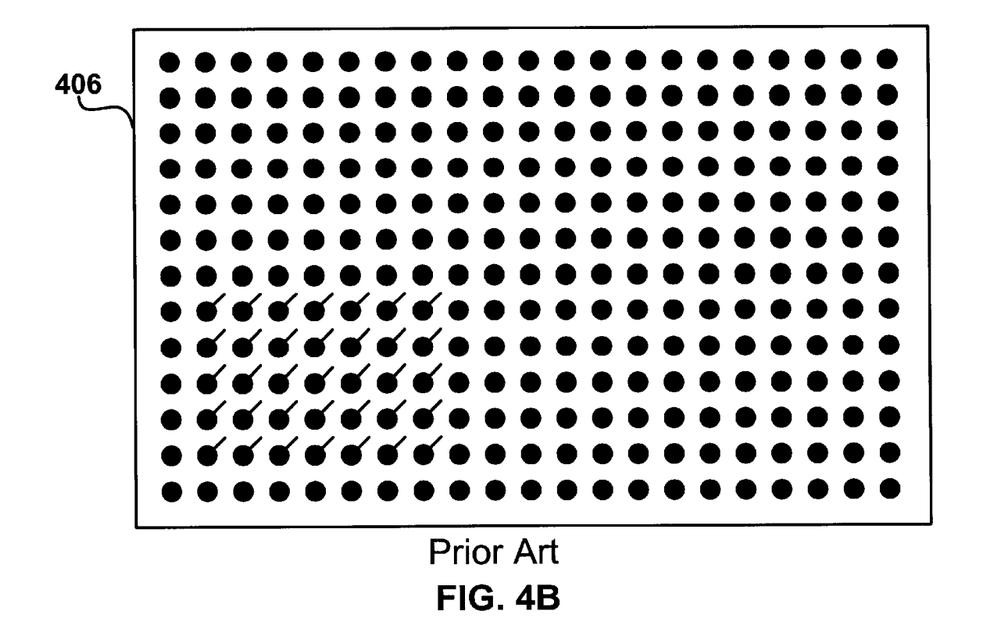
FIG. 4B is a drawing of a motion vector field produced using an embodiment of the present invention.

As shown in FIG. 4A, a central image area 404 moves to the position of a central image area 402, as indicated by the broken-line box in a field of observation 400 between a current frame and a next frame. FIG. 4B shows a motion vector field generated from the frames, one containing the area 404 and the other containing the area 402. A motion vector for each pixel in the area indicates that the pixel has moved in the direction of the motion.

Problem Formulation

The following is a mathematical derivation for generating data values representing a motion vector field from other data values representing individual picture elements (pixels) of two or more images.

Let E(x,y,t) denote the image brightness of the point (x,y) in the image plane at time t. Consider the displacement of a patch of the brightness pattern to be and v in the x- and y-directions within time T respectively. Without considering lighting condition change, shading effect, and occlusion in the scene, assume the brightness of the patch remains constant, i.e., $$E(x+u, y+v, t+T) - E(x,y,t) = 0 \tag{1}$$

It is well-known that this constraint by itself is not sufficient to solve (u,v). Assuming a smooth flow field, the problem of determining optical flow u and v is preferably formulated as to minimize the following objective function.

$$\epsilon = \int\int (\epsilon_c^2 + \alpha^2 \epsilon_s^2) dx dy \tag{2}$$

where $$\epsilon_c = E(x+u, y+v, t+T) - E(x,y,t) \tag{3}$$

$$\epsilon_s^2 = u_x^2 + u_y^2 + v_x^2 + v_y^2) \tag{4}$$

$\epsilon_c$ and $\epsilon_s^2$ are the global smoothness and the constant intensity constraints respectively with a relative weighting factor $\alpha^2$. Here $u_x$, $u_y$, $v_x$, and $v_y$ denote the partial derivatives of the u and v, with respect to x and y. Applying the Euler Equation from calculus of variations, we have $$\alpha^2 \nabla^2 u = \varepsilon_c \frac{\partial}{\partial u} E(x+u, y+v, t+T) \quad (5)$$

$$\alpha^2 \nabla^2 v = \varepsilon_c \frac{\partial}{\partial v} E(x+u, y+v, t+T)$$

where $\nabla^2 u$ and $\nabla^2 v$ are the Laplacian of u and v, respectively and may be approximated by $\nabla^2 v \approx \kappa(\bar{v}-v)$ and $\nabla^2 u \approx \kappa(\bar{u}-u)$, where $\bar{u}$, and $\bar{v}$ denote the local average of u and v, respectively.

Horn and Schunck Prior Art

Horn and Schunck take the Taylor's series expansion of $E(x+u,y+v,t+T)$ around the point (x,y,t).

$$E(x+u, y+v, t+T) = E(x,y,t) + E_x u + E_y v + E_t T + \in \quad (6)$$

where $E_x$, $E_y$ and $E_t$ are the partial derivatives of E in respect to x, y and t at (x,y,t) respectively. The notation $\in$ contains the second and higher order terms in u, v, and T. Eliminating $\in$ and combining Eq. 1 with, Eq. 6 leads to the well-known prior art optical flow constraint as shown in equation 7.

$$\epsilon_b = E_x u + E_y v + E_t T = 0 \quad (7)$$

This well-known prior art optical flow constraint is often derived directly from dE/dt=0 by applying the chain rules. Additionally, by substituting Eq. 6 into Eq. 5, the optical flow may be obtained iteratively as shown in equation 8.

$$u^{n+1} = \bar{u}^n - E_x \frac{E_x \bar{u}^n + E_y \bar{v}^n + E_t}{(\beta + E_x^2 + E_y^2)} \quad (8)$$

$$v^{n+1} = \bar{v}^n - E_x \frac{E_x \bar{u}^n + E_y \bar{v}^n + E_t}{(\beta + E_x^2 + E_y^2)} \quad \text{where } \beta = \kappa \alpha^2$$

For the majority of images where the higher order derivatives of the intensity function are not all zero, this first-order approximation may no longer lead to good motion estimates when the motion is large. For this reason the approach taken by Horn and Schunck only works well for a very small degree of motion.

Improvement is desired in which the approximation error of system equations becomes smaller and smaller as the updating process continues. Consequently, a new approach is needed to provide better and faster convergence, as well as capability to handle larger motion.

SUMMARY AND ADVANTAGES OF THE INVENTION

One advantage of the invention is in more accurately and efficiently processing consecutive video frames to determine the motion of objects in video frames and output a representation of that motion as an image motion vector field, wherein each component of the image vector field represents a pixel or group of pixels of a frame.

Another advantage of this invention is in migrating an observation point gradually, according to current motion estimates.

Yet a further advantage of this invention is within the inventive methodology in its capability of handling motion discontinuities.

To achieve the foregoing and other advantages, in accordance with all of the invention as embodied and broadly described herein, an apparatus for generating an image motion vector field which describes a motion of individual image components of a first image frame and corresponding image components of a second image frame in a sequence of image frames. The apparatus comprises a first frame memory for receiving the first image frame, a second frame memory for receiving a second image frame, and an optical flow calculator. The optical flow calculator is configured for generating an image motion vector field by iteratively comparing a predicted image with the second image frame. The predicted image is generated according to a current motion estimate in proximity to an observation point, wherein the observation point migrates according to a previous motion estimate and is implemented by the calculator to generate a current motion estimate.

In a further aspect of the invention, the optical flow calculator includes a gradient estimator configured to define a gradient function which approximates an image gradient value by performing an averaging function on motion estimates at a plurality of individual image component locations determined by the current motion estimate.

In yet a further aspect of the invention, the optical flow calculator includes a motion estimator configured to define a motion estimate function which approximates a velocity adjustment value by applying a motion function to gradient estimates at a plurality of individual gradient estimate locations determined by the current motion estimate.

In yet a further aspect of the invention, optical flow calculator includes a motion estimate averager configured to define a motion estimate averaging function which averages motion values at a plurality of motion estimate component locations determined by the current motion estimate.

In yet a further aspect of the invention, the averager applies a weighting function component to control outlier rejection of individual motion estimates being averaged.

In yet a further aspect of the invention, an image motion vector field is generated comprising the steps of receiving a first image frame having individual image components with intensity values, receiving a second image frame having corresponding image components with intensity values, initializing motion estimates, generating image motion vectors, and outputting the image motion vector field. The image motion vectors are iteratively generated by estimating image gradients in proximity to observation points; generating other motion estimates as the motion estimates, averaging the motion estimates; migrating the observation points according to the motion estimates, generating a predicted image frame according to the motion estimates and the first memory frame, calculating residual errors by taking a difference between the predicted image and the second image frame, determining if the residual error for each image component is less than a predetermined threshold, and accordingly if the motion estimate for the image component has converged, and ending the iterations for each motion estimate that has converged.

The present invention calculates optical flow, resulting in improved estimates over the prior art and an ability to cope with larger motion. In the present invention, the observation point of the Taylor's series expansion of the intensity function preferably moves in accordance with the current motion estimates. Hence, the constant intensity constraint is better satisfied as the iteration process continues. An local outlier rejection mechanism, whose observation point of also preferably moves in accordance with the current motion estimates may then be utilized to handle motion discontinuities in the flow field, significantly reducing the motion compensated mean squared error (MSE) and effectively improving the near motion boundaries observation point estimates. Local outlier rejection results in an effective means of sharpening the motion boundaries, which often are blurred due to the global smoothness constraint. Compared with the prior art, this new concept offers faster and better convergence and capability to handle a larger degree of motion, effectively reducing the motion compensated intensity difference and motion error. One skilled in the art will easily recognize that this concept may be readily adapted to many optical flow methods and apparatus.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

DETAILED DESCRIPTION

An apparatus for generating an image motion vector field which describes a motion of individual image components of a first image frame and corresponding image components of a second image frame in a sequence of image frames is now described. The apparatus comprises a first frame memory for receiving the first image frame, a second frame memory for receiving a second image frame, and an optical flow calculator. The optical flow calculator is configured for generating an image motion vector field by iteratively comparing a predicted image with the second image frame. The predicted image is generated according to a current motion estimate in proximity to an observation point, wherein the observation point migrates according to a previous motion estimate and is implemented by the calculator to generate a current motion estimate.

The prior art fails to handle a relatively large degree of motion, because for the majority of images the higher order derivatives of the intensity function are not all zero, therefore, the first-order approximation in Eq. 6 and 7 may no longer lead to good motion estimates when the motion is large. A second reason comes from an intrinsic local minimum problem from a gradient-based approach. When the motion is large, the initial condition may be too far away from the true solution. In searching for the solution, the optimization process may get stuck at a local minimum and the estimate may not be improved further.

The value (u,v) may be denoted to be the actual image velocity, or the displacement vector from time t to t+T, and $(u^n, v^n)$ the current estimate after the n-th iteration. Preferably, each iteration improves the estimates of the flow field (i.e., $|u^n-u|^2+|v^n-v|^2 \to 0$ as $n \to \infty$). The present invention compares the predicted image, $E(x+u^n,y+v^n,t+T)$, with the reference image $E(x,y,t)$, in order to improve the current estimates in the next iteration.

The derivation starts from taking the Taylor's series expansion of $E(x+u,y+v,t+T)$ around $(x+u^n,y+v^n,t+T)$, which migrates over the iteration process, instead of around the fixed point (x,y,t) as in Horn and Schunck's algorithm. Therefore, $$E(x+u, y+v, t+T)E(x+u^n+(u-u^n), y+v^n+(v-v^n), t+T)+\Delta u E_{x_n}+\Delta u E_{y_n}+\in' \quad (9)$$

where $\Delta u=u-u^n$ and $\Delta v=v-v^n$, and $E_{x_n}$, $E_{y_n}$ are the partial derivatives at $(x+u^n,y+v^n,t+T)$. The term $\in'$ contains the second and higher order terms in $\Delta u$ and $\Delta v$. As the estimate preferably approaches the true solution and the optimization process proceeds, $\Delta u$ and $\Delta v$ becomes smaller and smaller. This means that the higher order terms represented by $\in'$ also becomes smaller.

The image gradients $E_{x_n}$ and $E_{y_n}$ are estimated at the point $(x+u^n, y+v^n, t+T)$, which migrates with the current estimates on the motion field. By eliminating $\in'$, a new optical flow constraint is derived:

$$\epsilon_\Delta=\Delta u E_{x_n}+\Delta v E_{y_n}+E_{d_n}=0 \quad (10)$$

where $$E_{d_n}=E(x+u^n, y+v^n, t+T)-E(x,y,t). \quad (10a)$$

This algorithm aims to find the adjustment of the velocity $\Delta u$ and $\Delta v$ at each iteration. From Eq. 5 and 10, the optical flow may be obtained using the following new iterative equations.

$$u^{n+1} = \bar{u}^n - E_{x_n}\left(\frac{E_{x_n}(\bar{u}^n - u^n) + E_{y_n}(\bar{v}^n - v^n) + E_{d_n}}{(\beta + E_{x_n}^2 + E_{y_n}^2)}\right) \quad (11)$$

$$v^{n+1} = \bar{v}^n - E_{x_n}\left(\frac{E_{x_n}(\bar{u}^n - u^n) + E_{y_n}(\bar{v}^n - v^n) + E_{d_n}}{(\beta + E_{x_n}^2 + E_{y_n}^2)}\right)$$

Figure 8:
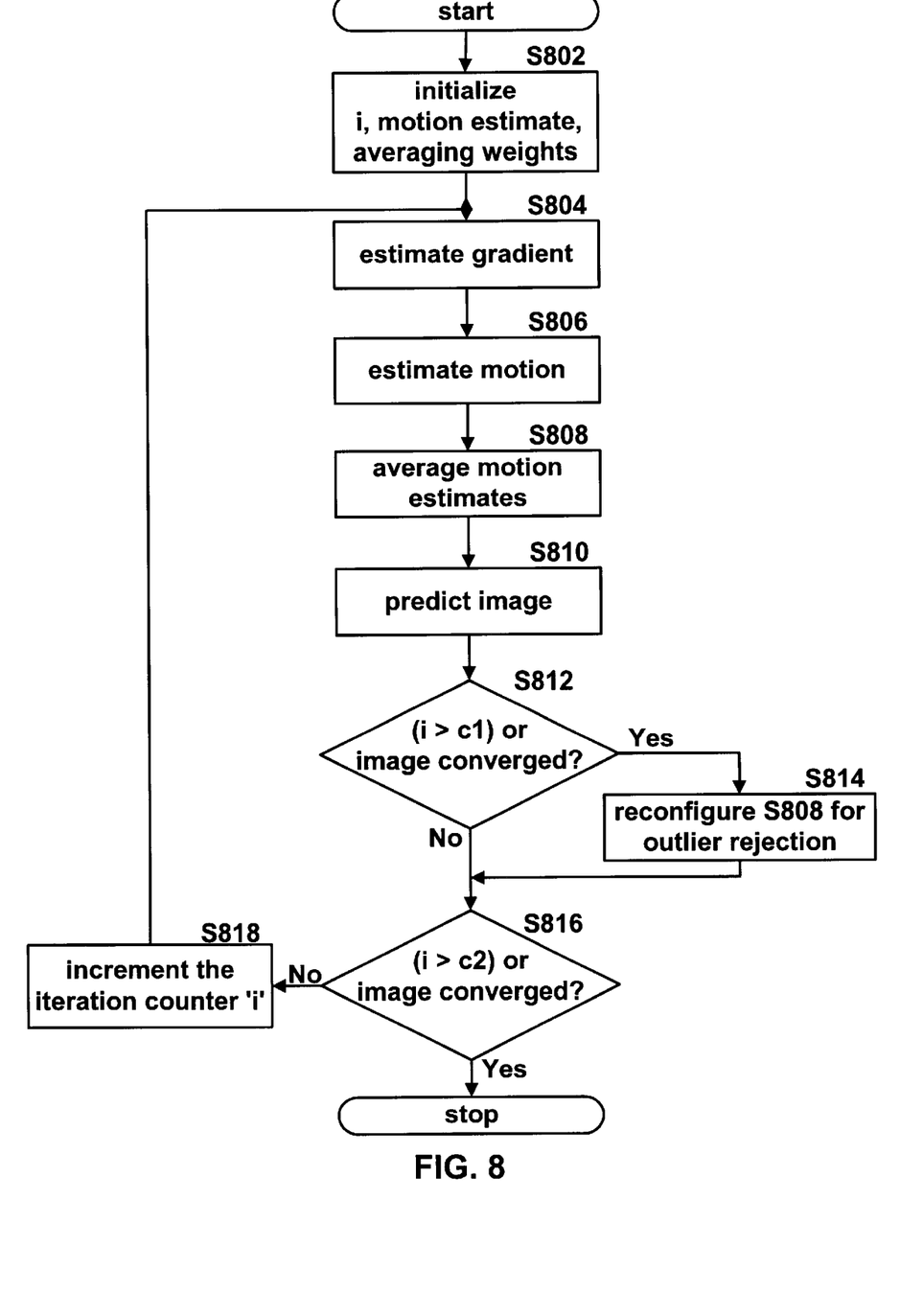
FIG. 8 is a block diagram of an aspect of the present invention which performs an optical flow calculation for an image component.
Figure 9A:
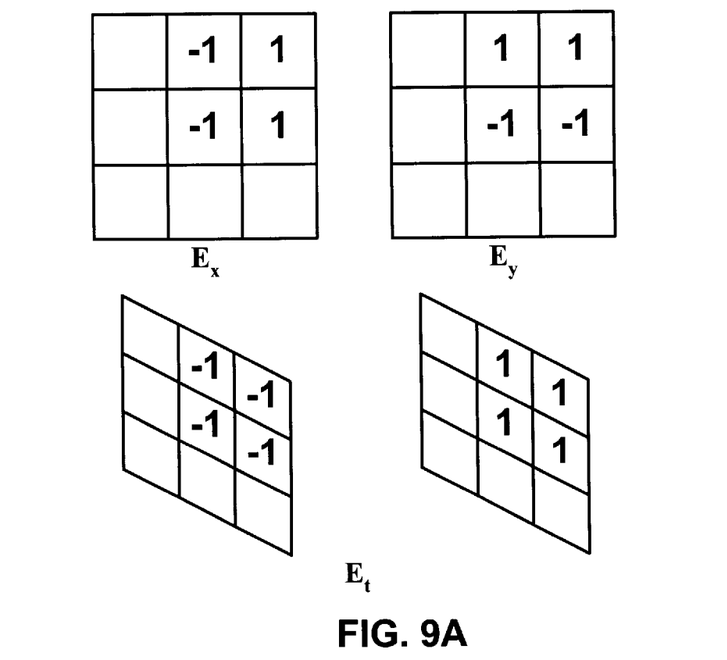
FIG. 9A is a drawing showing gradient operators used in an example of the prior art.
Figure 9B:
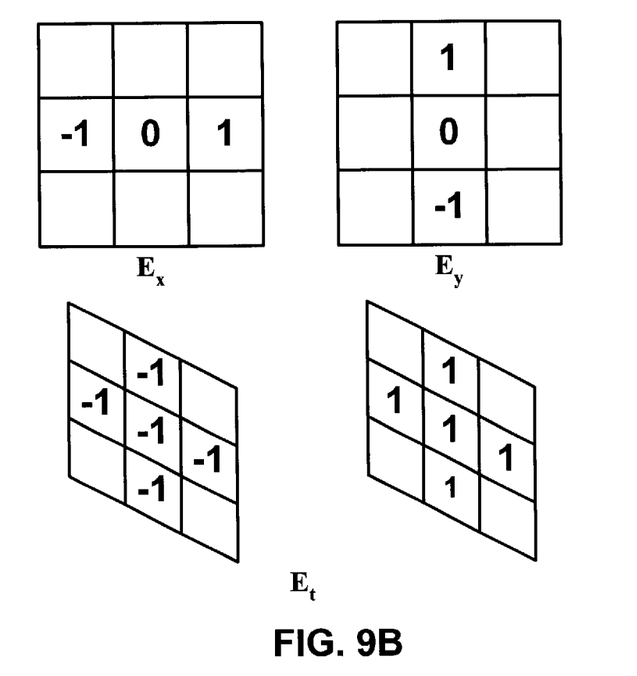
FIG. 9B is a drawing showing gradient operators used in an example of the present invention.

We will now discuss Estimation of Image Gradients. For gradient-based optical flow algorithms, it is critical to have robust estimation on image gradients. The intensity function is defined on discrete points both in time and space. Therefore, to estimate the partial derivatives of the 3D intensity function E(x,y,t), some differencing operator has to be used in order to approximate the differentiation. Taking the averaged spatial gradients from both frames helps the stability of this type of approach. FIG. 8A shows the gradient operators used in the original Horn and Schunck's paper. FIG. 8B shows the gradient operators used in an embodiment of the present invention. The prior art of Horn and Schunck suggest to estimate $E_x$, $E_y$, and $E_t$ at the point in the center of a cube formed by eight measurements defined as follows. However, an embodiment of the present invention as illustrated in FIG. 8 uses different gradient operators since they offer a less biased approximation of the gradient function. The gradients are approximated considering a 4 neighbor system. Following the original formulation, they are defined as follows.

$$E_x \approx \frac{1}{4}\{E(x+1, y, t) - E(x-1, y, t) + \qquad (12)$$
$$E(x+1, y, t+1) - E(x-1, y, t+1)\}$$

$$E_y \approx \frac{1}{4}\{E(x, y+1, t) - E(x, y-1, t) +$$
$$E(x, y+1, t+1) - E(x, y+1, t+1)\}$$

$$E_t \approx \frac{1}{5}\{E(x, y, t+1) - E(x, y, t) + E(x+1, y, t+1) -$$
$$E(x+1, y, t) + E(x-1, y, t+1) -$$
$$E(x-1, y, t) + E(x, y+1, t+1) -$$
$$E(x, y+1, t) + E(x, y-1, t+1) - E(x, y+1, t)\}$$

In the present invention, the approximation of $E_x$, $E_y$, and $E_{d_n}$ preferably depends on the current motion estimates ($\hat{u}$, $\hat{v}$).

$$E_x \approx \frac{1}{4}\{E(x+1, y, t) - E(x-1, y, t) + E(x+\hat{u}+1, y+\hat{v}, t+1) - E(x+\hat{u}-1, y+\hat{v}, t+1)\} \qquad (13)$$

$$E_y \approx \frac{1}{4}\{E(x, y+1, t) - E(x, y-1, t) + E(x+\hat{u}, y+\hat{v}+1, t+1) - E(x+\hat{u}, y+\hat{v}+1, t+1)\}$$

$$E_t \approx \frac{1}{5}\begin{cases} E(x+\hat{u}, y+\hat{v}, t+1) - E(x, y, t) + \\ E(x+\hat{u}+1, y+\hat{v}, t+1) - E(x+1, y, t) + E(x+\hat{u}-1, y+\hat{v}, t+1) - E(x-1, y, t) + \\ E(x+\hat{u}, y+\hat{v}+1, t+1) - E(x, y+1, t) + E(x+\hat{u}, y+\hat{v}-1, t+1) - E(x, y+1, t) \end{cases}$$

Here we observe that the spatial derivatives $E_x$ and $E_y$ are the averaged value over both frames. These estimates apparently are prone to error when the motion is large since the change of image structure at the same location may be too large for these averages to provide useful information.

Since ($x+\hat{u}$, $y+\hat{v}$, $t+1$) may not fall on image grids, bilinear interpolation is preferably used to approximate the image gradient at non-grid locations. Bilinear interpolation of the image gradient may offer much better convergence compared with nearest neighbor approximation.

The five-point average that is often used for computing $E_{d_n}$ may provide some pre-filtering effect. Such pre-filtering has been shown to improve Horn and Schunck's prior art. Under our new formulation, on the contrary, this pre-filtering would actually slow down the convergence. Preferably using the definition in Eq. 10a to directly compute $E_{d_n}$ excludes the unnecessary smoothing effect, and thus leading to a much smaller $\epsilon_A$ and an even faster convergence.

The existence of occlusion and multiple motions in a video scene causes the discontinuity to arise in the motion field. At motion discontinuities, the smoothness constraint is no longer valid. To handle motion boundaries, outlier rejection may be used to stop the smoothness constraint from propagating across the motion boundaries. Outlier rejection (OR) refers to the mechanism to exclude data which does not fit into the underlying model. Normally, a decision function is defined in order to detect and reject the outlier. A decision function may be global or local, binary or probabilistic, error-based or rank-based. A global decision function applies a criterion globally in the data domain to reject the potential outlier. A local decision function, on the other hand, adapts itself to the local error characteristics. Depending on whether the weighting of the data point has a binary or continuous form, the decision-making scheme may be categorized as binary (hard) or probabilistic (soft). Comparing between error-based and rank-based schemes, a rank-based decision function may tend to adapt better to the characteristics of the error function, but often with a higher computation cost. The present invention preferably adopts a local, binary, and rank-based decision function that is detailed here.

Under the present invention, the outlier rejection mechanism may be naturally carried out by changing the way that the local motion averages, $\bar{u}$ and $\bar{v}$, are calculated, by discarding the outlier in the neighborhood. For convenience, let x=(x,y) denote the pixel location, and u(x)=(u(x),v(x)) be the motion of pixel x. Without outlier rejection, the local motion average depends on all the neighbors in the pre-defined neighborhood.

$$\bar{u}(x_i) = \frac{\sum_{x_j \in N(x_i)} u(x_j)\omega(x_j)}{\sum_{x_j \in N(x_i)} \omega(x_j)} \qquad (14)$$

where $N(x_i)$ denotes the neighborhood of the pixel located at $x_i$, and $\omega(x_j)$ is the weight for neighbor $x_j$, $x_j \in N(x_i)$. We choose a neighborhood size of eight. The corresponding weight $\omega(x_j)=2$ for non-diagonal neighbors and $\omega(x_j)=1$ for diagonal ones.

For detecting outlier, first we define the motion similarity to be the squared distance between two motion vectors, (called motion difference square, or MDS), defined by $d(x_i, x_j)=\|u(x_i)-u(x_j)\|^2$ where $x_i$ and $x_j$ are two neighboring pixels. Eq. 14 becomes $$\bar{u}(x_i) = \frac{\sum_{x_j \in N(x_i)} u(x_j)\omega(x_j)g(x_i, x_j)}{\sum_{x_j \in N(x_i)} \omega(x_j)g(x_i, x_j)} \qquad (15)$$

where $g(x_i, x_j)=g(d(x_i, x_j))$ is the weighting function for controlling the local outlier rejection process. Equation 15 is a function of the motion similarity measure between two neighboring pixels. Depending on whether g takes a binary or continuous form, a hard or soft decision mechanism may be designed.

A hard decision approach may preferably define g to be a binary function, which either accepts or rejects a particular neighbor, using a thresholding technique. Let $\tilde{d}_r$ denote the r-th rank (in ascending order) of the ordered MDS in the neighborhood: $\{d(x_i, x_j), x_j \in N(x_i)\}$, i.e., $\tilde{d}_0 \leq \ldots \leq \tilde{d}_{|N(x_i)|-1}$, where $|N(x_i)|$ is the neighborhood size. Define g $$g(x_i, x_j) = \begin{cases} 1 & \text{if } d(x_i, x_j) \leq T_{or}\tilde{d}_r, x_j \in N(x_i) \\ 0 & \text{otherwise} \end{cases} \quad (16)$$

where $T_{or} \geq 1$ is the threshold constant. This means that a neighboring pixel $x_j$ is rejected if its MDS to the center pixel, $d(x_i, x_j)$, is greater than $T_{or}$ times of the reference $\tilde{d}_r$. This mechanism allows the outlier rejection to be insensitive to the magnitude of the motion difference. Moreover, in areas with smooth motion, all the neighbors may be accepted. For the illustrated embodiment of the present invention $\tilde{d}_3$ as a reference and $T_{or}=8.0$ were empirically choosen.

The present invention is a significant improvement over the prior art.. The integrated outlier rejection (OR) also provides an effective means to further improvements as evidenced by a more accurate motion field and a smaller MSE.

Preferably, the outlier rejection routine is not imposed in order to refine the estimates near motion boundaries until the motion estimates have converged under global smoothness. The OR is effective for sharpening the motion boundaries. The motion boundary is much more apparent, especially near the forearm of the player, when the outlier rejection is used for final refinement.

Figure 5:
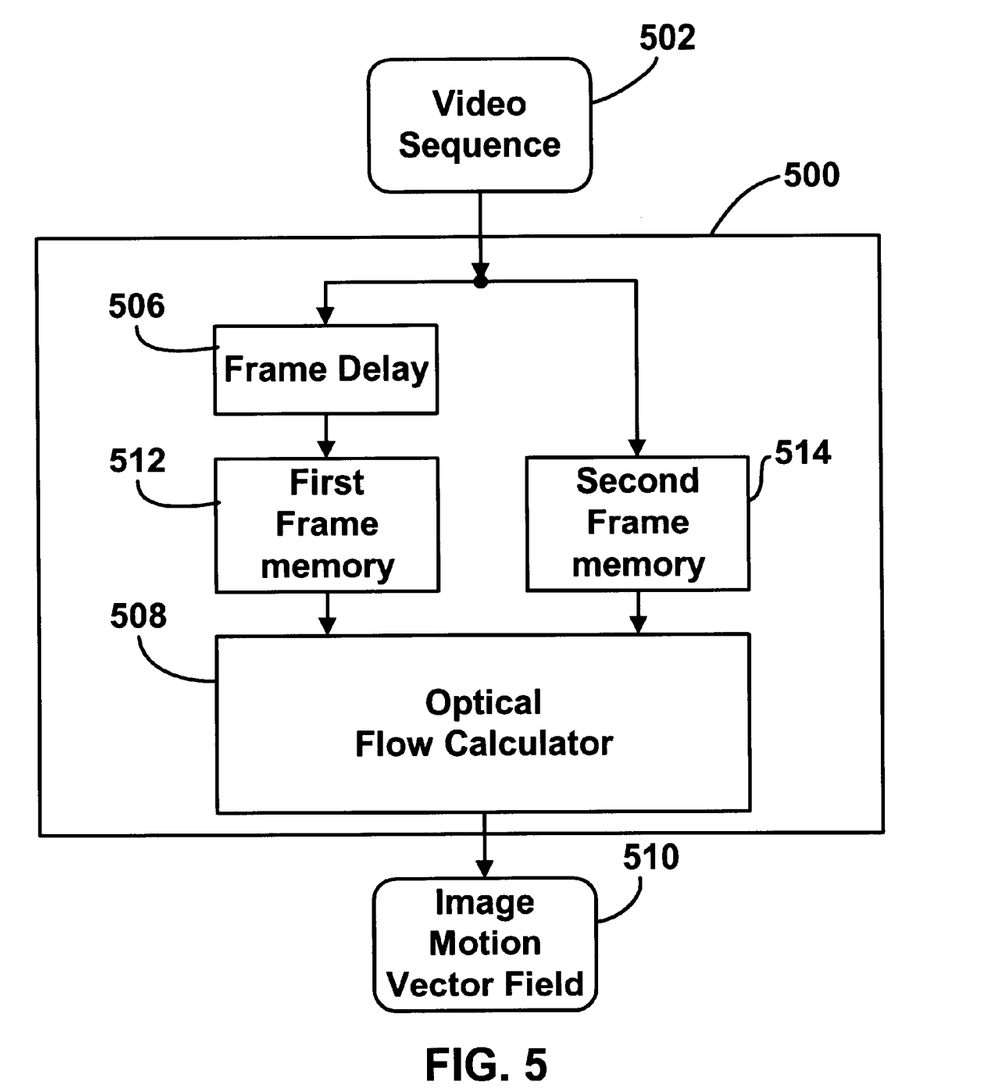
FIG. 5 is a block diagram of an embodiment of the present invention

FIG. 5 is a block diagram of a motion detection apparatus 500 which may be used to generate motion vector fields in accordance with the present invention. This apparatus 500 preferably accepts a video sequence 502 as input. The video sequence 502 takes two separate routes. A first route preferably takes the video sequence 502 through a frame delay device 506 to a first frame memory 512. A second route preferably takes the video sequence to a second frame memory 514. The first memory frame 512 and the second frame memory 514 provide their respective frames to an optical flow calculator 508. The optical flow calculator 508 then preferably processes a pair of images from the video sequence 502 as previously described and outputs an image motion vector field 510, which describes any motion that may have occurred between the frames.

Although the motion detection apparatus 500 is shown as receiving two frames of data, it is contemplated that, in a steady state operation, only one new frame of data may be applied to the apparatus 500 at any given time. Data located in frame memory 514 may simply be moved to delayed frame memory 512 thereby becoming the first frame when the frame memories are moved to the optical flow calculator.

As described above, FIG. 6 is a block diagram of an optical flow calculator 600 in accordance with the present invention. The optical flow calculator an optical flow calculator generates an image motion vector field 660 by iteratively comparing a predicted image with a reference image. The predicted image is generated according to a current motion estimate around an observation point. The observation point migrates according to a previous motion estimate and is used to generate a new current motion estimate.

Figure 6:
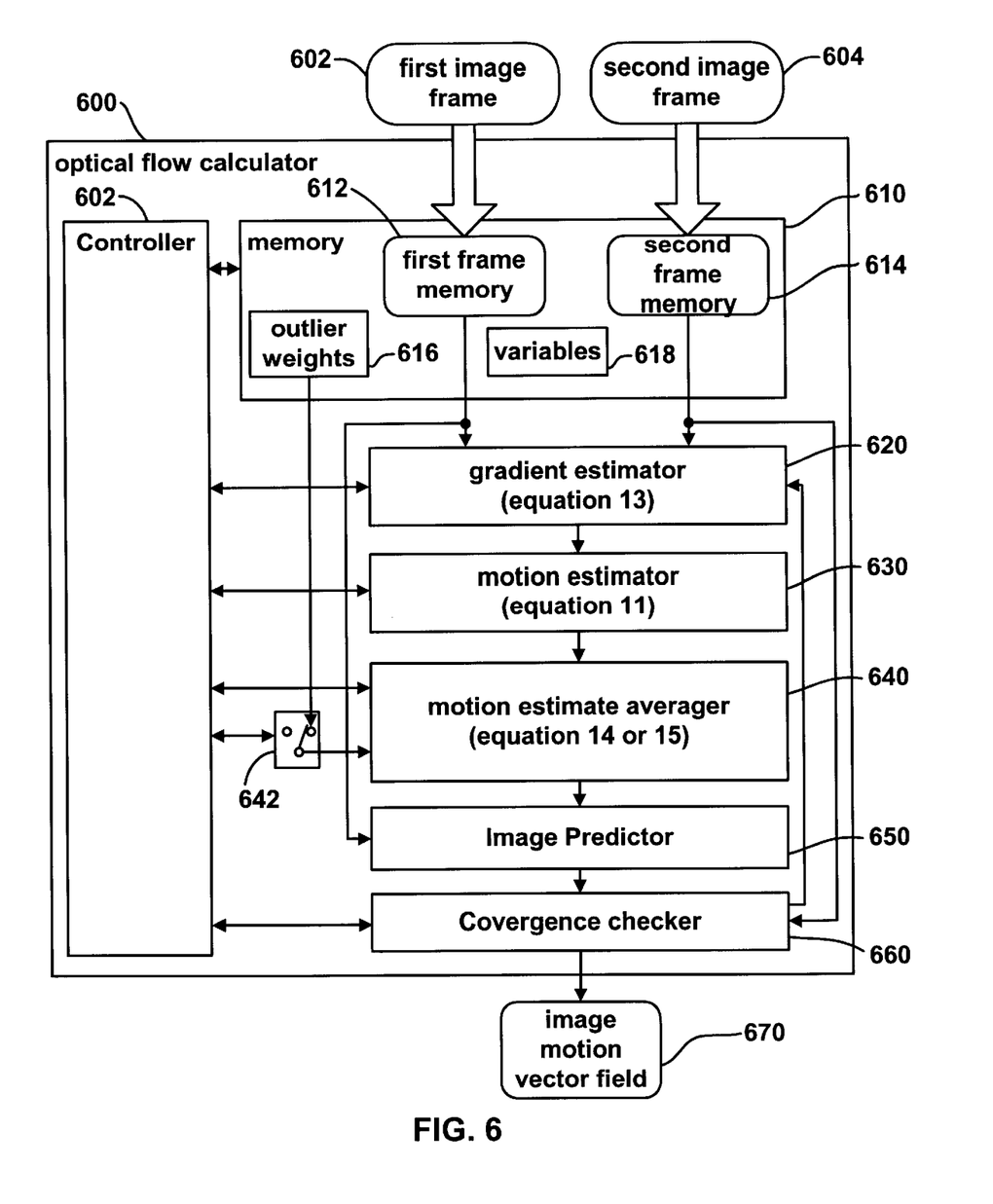
FIG. 6 is a block diagram of an aspect of the present invention which performs an optical flow calculation.

In the presently illustrated embodiment of the invention, the optical flow calculator 600 includes a controller 602, a memory 610, a gradient estimator 620, a motion estimator 630, a motion estimate averager 640, an outlier switch 642, a image predictor 650 and a convergence checker 660. Each of these elements work together to generate the image motion vector field 670 from a first image frame 602 a the second image frame 604.

The memory 610 includes a first frame memory 612 which preferably accepts as input the first image frame 602, and a second frame memory 614 which preferably accepts as input the second image frame 604. The memory 610 may also include locations to hold variables such as iteration counts, iteration thresholds, weighting parameters, and current estimates for use in assisting the controller 602 in controlling the operation of the optical flow calculator 600. The image frames contained in the first frame memory 612 and the second frame memory 614 are made up of a plurality of image components, each image component represented by an intensity value. Each image component may be a pixel or group of pixels.

The optical flow calculator 600 controller may initialize several variables at the beginning of each image component calculation including the iteration count, the initial motion estimate, and the outlier rejection weighting values.

The gradient estimator 620 inputs intensity values from the first and second frame memories to calculate a gradient estimate. The points used are determined in part by the previous estimate. Equation 13 describes the calculation.

The gradient estimate output from the gradient estimator is inputted to the motion estimator 630 which calculates the adjusted velocity ($\Delta u$ and $\Delta v$) for the iteration as described by equation 11. Next, the motion estimates are averaged by the motion estimate averager 640. The motion estimate averager is configured to execute equation 14 which performs a local average of the velocity estimates around the neighborhood. An outlier rejector switch 642 may switch the mode of the motion estimate averager 640 to input outlier weighting values and reconfigure the motion estimate averager 640 to execute equation 15 instead of equation 14. Equation 15 adds a weighting function that controls the outlier rejection. This switch may normally be made after the convergence detector 660 has detected convergence or after a predetermined number of iterations. The output of the motion estimate averager 640 is input to the image reconstructor 650 which will create a predicted image around the point of interest based on the first frame memory and the predicted motion vector using motion compensation. The convergence checker 660 will then compare this image with the values stored in the second frame memory 614 and determine if the error is below a predetermined threshold value. If the image converges before the outlier rejection is implemented, then the convergence detector 660 informs the controller that the iterations need to continue, but that optical flow calculator 600 needs to switch into an outlier rejection mode. If the image converges while the optical flow calculator 600 is in outlier rejection mode, then the estimation is complete for this point, the image motion vector is output to the image motion vector field 670 and the process will continue to the next image component until all of the image components in the frame memories 612 and 614 have been processed.

One skilled in the art can see that this method of performing outlier rejection allows the observation point to migrate based on the previous estimates, thus improving the result over the prior art.

Figure 7:
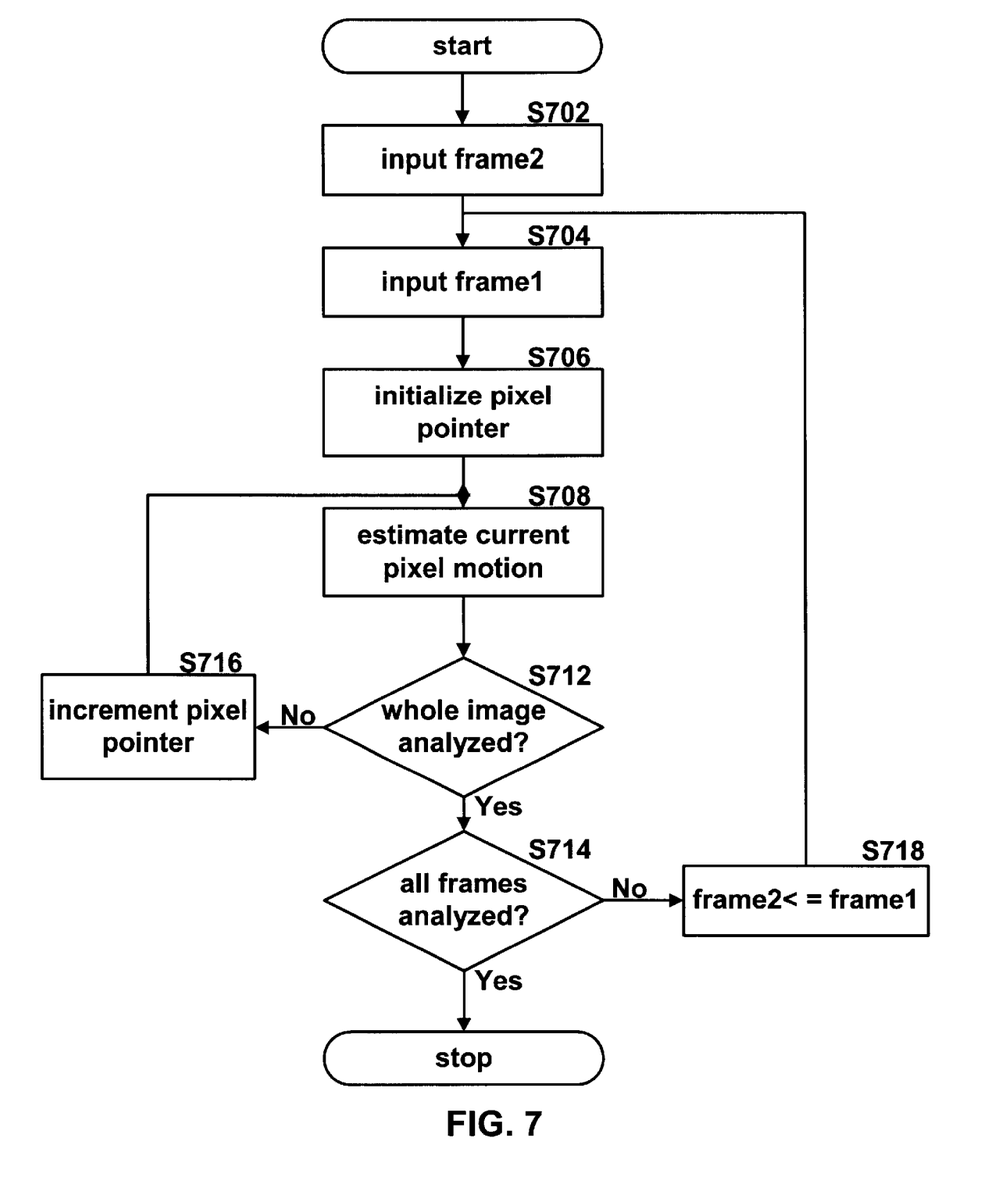
FIG. 7 is a flow diagram of an aspect of the present invention which performs an optical flow calculation for a complete image frame.

FIG. 7 is a flow-chart diagram which illustrates the operation of the optical flow calculator 508 in an exemplary embodiment of the invention. The process begins at step S702 where a second image frame is input to the optical flow calculator 508. At step S704, a first image frame is input to the optical flow calculator 508. Preferably, the first frame is delayed such that the second frame represents a frame from video sequence 502 that is later in time than the first frame by delta time T. As per the illustrated embodiment of the present invention, a pixel pointer that points to the pixels in each frame is initialized at step S706. An estimate of current pixel motion is made at step S708. In step S712 a determination is made as to whether the whole image has been analyzed. If the whole image has not been analyzed, then at step S716 the pixel pointer is incremented and the method then resumes at step S708. If the whole image has been analyzed, then at step S714 a determination is made as to whether all frames in the sequence have been analyzed. If not, then the image stored in the first memory frame is moved to the second memory frame and the process resumes at step S704. If at step S714, it is determined that all frames had been analyzed, then the process is complete.

FIG. 8 is a flow-chart diagram which illustrates an aspect of an exemplary embodiment of the invention that calculates a motion vector for an image component of a first and second image frame. At step S802, several variables are initialized including an iteration counter 'i', a motion estimate, and averaging weight values. At step S804, a gradient estimate is made using equation 13 which was previously described. The data values for this calculation are obtained from a first memory frame 512 and a second memory frame 514. The results of this calculation are used at step S806 where a motion estimate is made using equation 13, which was previously described. Next, an average motion estimate is performed on the data at step S808. Step S808 is initially configured to perform equation 14 which was previously described, and will continue to perform this equation until reconfigured. Step S810 generates a predicted image based on the first image frame and the current motion estimate. At step S810, a determination is made as to whether a predetermined number of iterations 'c1' or if the current motion estimate has converged. To make the determination of whether the current motion estimate has converged, the predicted image is compared with a reference image to see if it's difference is less than a predetermined threshold value. If the determination at step S812 is positive, then processing proceeds to step S814 where step S808 is reconfigured to perform equation 15 which has been previously described, after which processing proceeds to step S816. If the determination at step S812 is negative, then processing proceeds to step S816. At step S816, a determination is made as whether the number of iterations has past a second predetermined value 'c2' or of the image has converged. If the determination at step S814 is positive, then processing stops and the present estimate may be used as the image vector for this image component. If the determination at step S816 is negative, then processing proceeds to step S818 where the iteration counter 'i' is incremented. Finally execution is passed back to step S804 to perform another iteration.

Although the present invention has been fully described by way of examples with reference to the accompanying drawings, it is to be noted that various changes and modifications will be apparent to those skilled in the art. For example, it will be apparent to those of skill in the art that the method and apparatus for estimating motion of the present invention may be modified for use in conjunction with other video processing systems. Therefore, it is contemplated that it may be practiced as outlined above with modifications within the spirit and scope of the claims.

We claim:

1. An apparatus for generating an image motion vector field which describes a motion of individual image components of a first image frame and corresponding image components of a second image frame in a sequence of image frames, the apparatus comprising:

(a) a first frame memory for receiving said first image frame;

(b) a second frame memory for receiving a second image frame; and (c) an optical flow calculator capable of calculating optical flow from said first image frame and said second image frame using the iterative formula:

$$u^{n+1} = \bar{u}^n - E_{x_n}\left(\frac{E_{x_n}(\bar{u}^n - u^n) + E_{y_n}(\bar{v}^n - v^n) + E_{d_n}}{(\beta + E_{x_n}^2 + E_{y_n}^2)}\right)$$

$$v^{n+1} = \bar{v}^n - E_{x_n}\left(\frac{E_{x_n}(\bar{u}^n - u^n) + E_{y_n}(\bar{v}^n - v^n) + E_{d_n}}{(\beta + E_{x_n}^2 + E_{y_n}^2)}\right)$$

wherein:

(i) u denotes an x image velocity estimate;

(ii) v denotes a y image velocity estimate;

(iii) $\bar{u}$ denotes an x local motion average;

(iv) $\bar{v}$ denotes a y local motion average;

(v) $E_x$ denotes an x image gradient;

(vi) $E_y$ denotes a y image gradient; and (vii) n denotes iterations.

2. The apparatus according to claim 1, wherein each image component is a pixel.

3. The apparatus according to claim 1, wherein each image component includes a plurality of pixels.

4. The apparatus according to claim 1, wherein said optical flow calculator includes a gradient estimator configured to use a gradient function which approximates an image gradient value by performing an averaging function on intensity values at a plurality of individual image component locations determined by the current motion estimate.

5. The apparatus according to claim 4, wherein said gradient estimator is configured to interpolate a value for a selected motion estimation component location from selected motion estimation component locations around said selected motion estimate location when there is no motion estimate for said selected motion estimation component location.

6. The apparatus according to claim 1, wherein said optical flow calculator includes a motion estimator configured to use a motion estimate function which approximates a motion value by applying a motion function to gradient estimates at a plurality of individual gradient estimate locations determined by the current motion estimate.

7. The apparatus according to claim 1, wherein said optical flow calculator includes a motion estimate averager configured to use a motion estimate averaging function which averages motion values at a plurality of motion estimate component locations determined by the current motion estimate.

8. The apparatus according to claim 7, wherein, said averager applies a weighting function component to control outlier rejection of individual motion estimates being averaged.

9. The apparatus according to claim 7, wherein said optical flow calculator includes an image predictor configured to generate a predicted image from averaged motion values and said first image frame at an image component location.

10. The apparatus according to claim 1, wherein a weighting function component has a value based upon an iteration count or a convergence.

11. The apparatus according to claim 1, wherein said optical flow calculator is configured for generating an image motion vector field by iteratively comparing a predicted image with said second image frame, said predicted image being generated according to a current motion estimate in proximity to an observation point, said observation point capable of migrating according to a previous motion estimate and is implemented by the calculator to generate a current motion estimate.

12. A method for generating an image motion vector field comprising the steps of:
 (a) receiving a first image frame having individual image components with intensity values;
 (b) receiving a second image frame having corresponding image components with intensity values;
 (c) initializing motion estimates;
 (d) generating image motion vectors using the iterative formula:

$$u^{n+1} = \overline{u}^n - E_{x_n}\left(\frac{E_{x_n}(\overline{u}^n - u^n) + E_{y_n}(\overline{v}^n - v^n) + E_{d_n}}{(\beta + E_{x_n}^2 + E_{y_n}^2)}\right)$$

$$v^{n+1} = \overline{v}^n - E_{x_n}\left(\frac{E_{x_n}(\overline{u}^n - u^n) + E_{y_n}(\overline{v}^n - v^n) + E_{d_n}}{(\beta + E_{x_n}^2 + E_{y_n}^2)}\right);$$

wherein:
 (i) u denotes an x image velocity estimate;
 (ii) v denotes a y image velocity estimate;
 (iii) $\overline{u}$ denotes an x local motion average;
 (iv) $\overline{v}$ denotes a y local motion average;
 (v) $E_x$ denotes an x image gradient;
 (vi) $E_y$ denotes a y image gradient; and
 (vii) n denotes iterations.

13. The method according to claim 12, wherein each image component is a pixel.

14. The method according to claim 12, wherein each image component includes a plurality of pixels.

15. The method according to claim 12, wherein said step of generating image motion vectors includes:
 (a) estimating image gradients in proximity to observation points;
 (b) generating other motion estimates, as the motion estimates;
 (c) averaging the motion estimates;
 (d) migrating the observation points according to said motion estimates;
 (e) generating a predicted image frame according to said motion estimates and said first memory frame;
 (f) calculating residual errors by taking a difference between said predicted image and said second image frame;
 (g) determining if the residual error for each image component is less than a predetermined threshold, and accordingly if the motion estimate for said image component has converged; and
 (h) ending said iterations for each motion estimate that has converged.

16. The method according to claim 15, wherein said step of estimating image gradients further includes the step of estimating image gradients between said individual image components and said corresponding image components by performing an averaging function on intensity values at a plurality of individual image component locations and corresponding image components according to said motion estimate.

17. The method according to claim 15, wherein said step of generating other motion estimates further includes the step of approximating a motion estimate between said individual image components and said corresponding image components by applying a motion function to gradient estimates at a plurality of individual gradient estimate locations determined by a current motion estimate.

18. The method according to claim 15, wherein said step of averaging the motion estimates further includes the step of averaging motion estimates in the neighborhood of said individual image component using a motion averaging function.

19. The method according to claim 18, further including the step of interpolating a value for a selected motion estimation component location from said selected motion estimation component locations surround a selected motion estimate location when there is no motion estimate for said selected motion estimation component location.

20. The method according to claim 18, further including the step of applying a weighting function to control outlier rejection of individual motion estimates being averaged.

21. The apparatus according to claim 18, wherein the weighting function has a value based upon an iteration count or a convergence.

* * * * *